April 29, 1952  N. J. PFEIFFER ET AL  2,594,492
APPARATUS FOR MANUFACTURING WHIPPED CREAM
Filed May 19, 1950  6 Sheets-Sheet 3
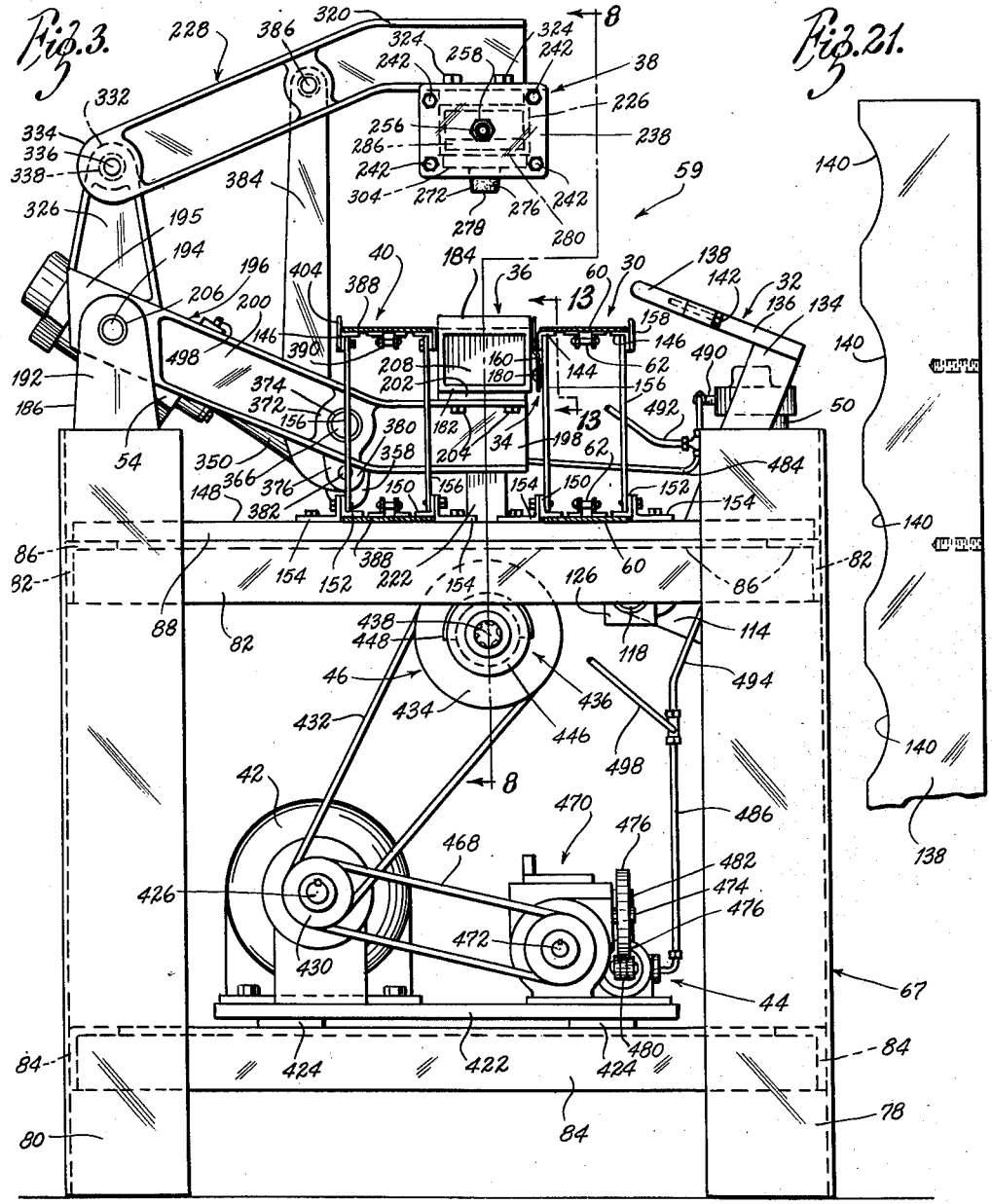
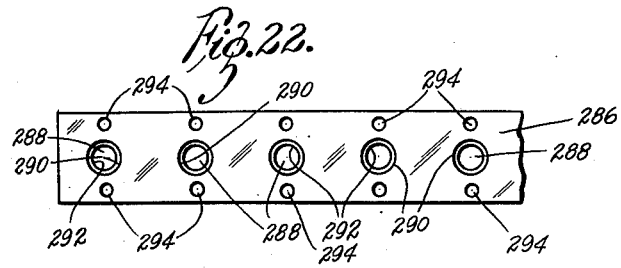
INVENTORS:
NORMAN J. PFEIFFER,
FRED F. SUELLENTROP,
BY Geo J Mager
THEIR ATTORNEY

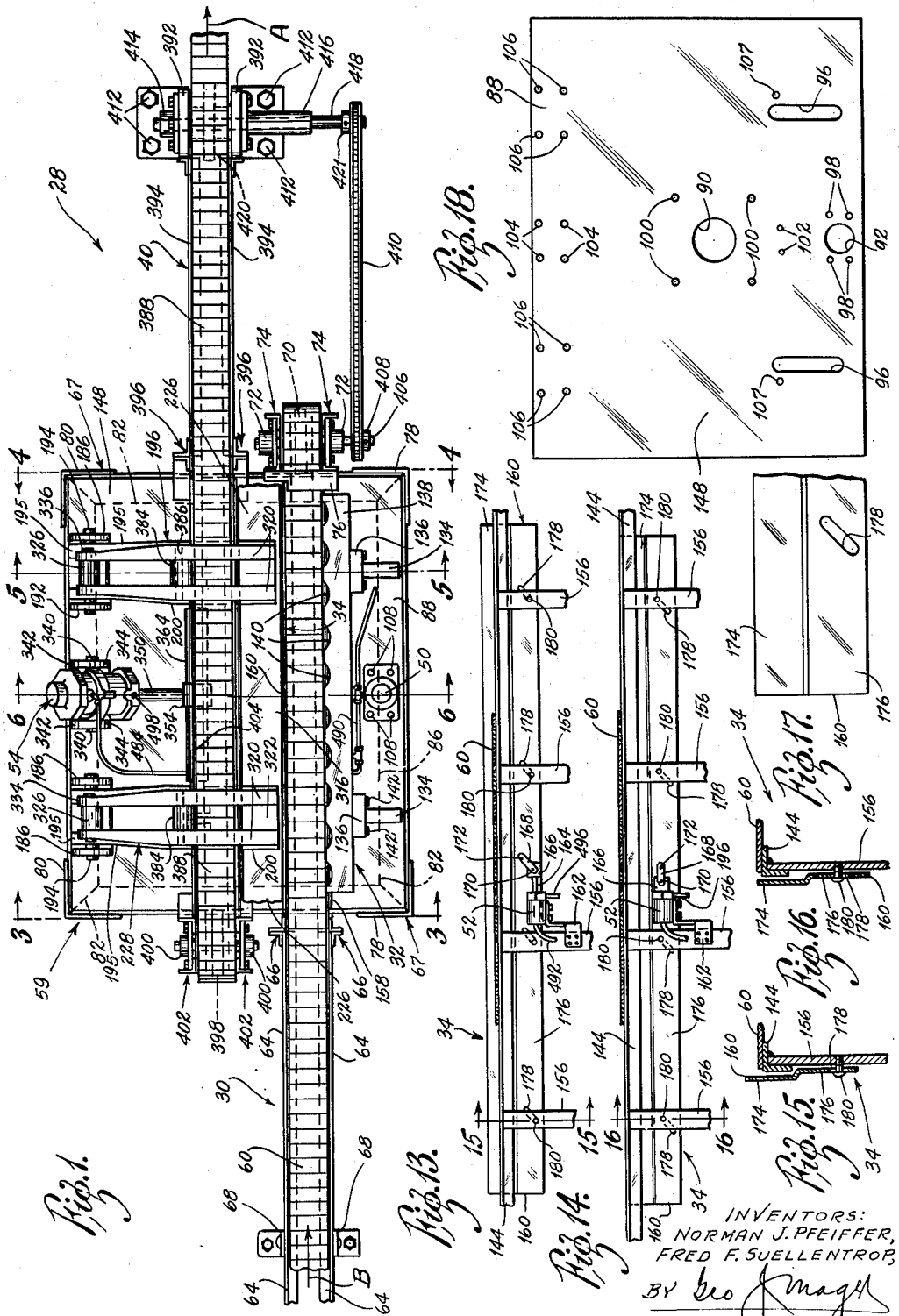

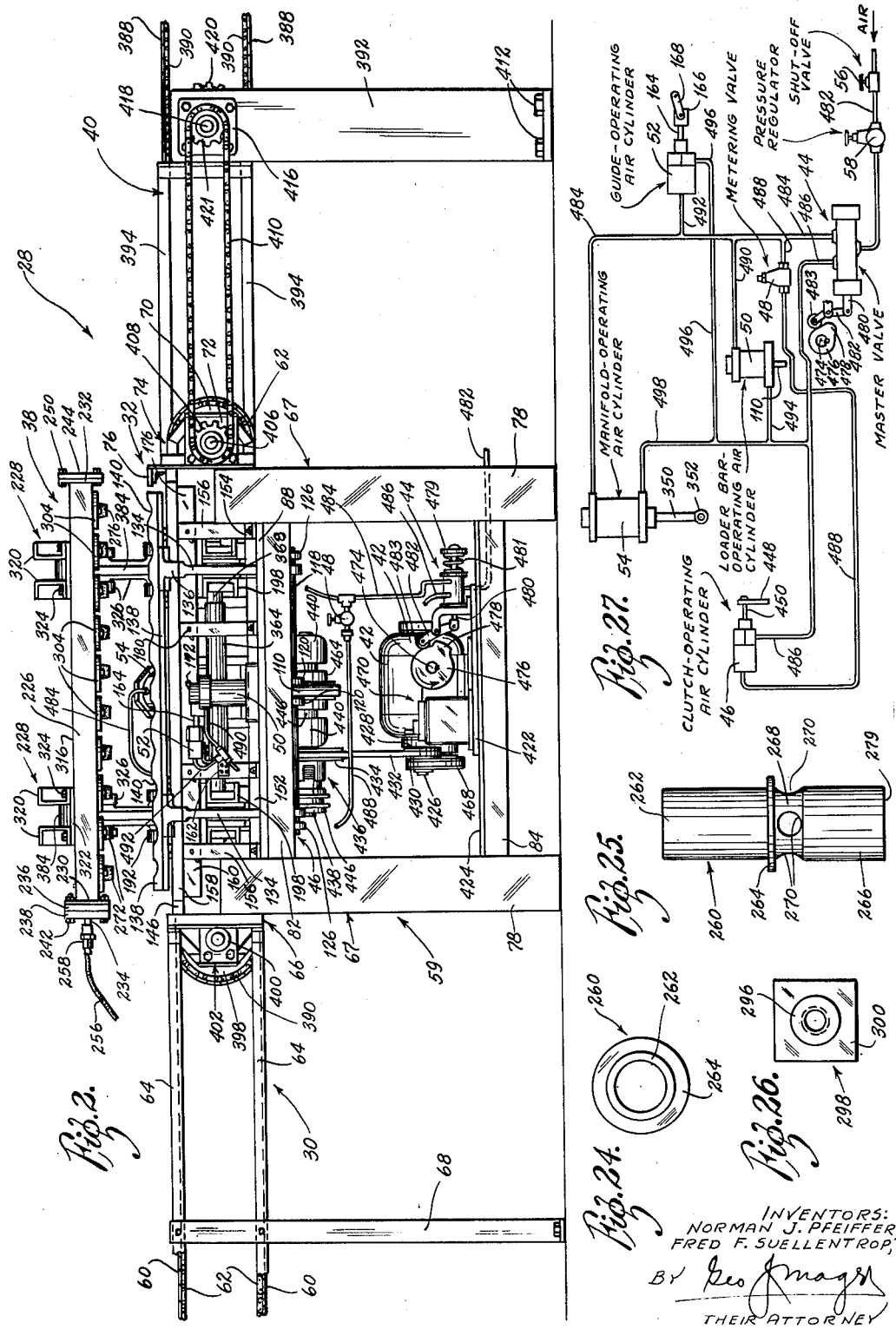

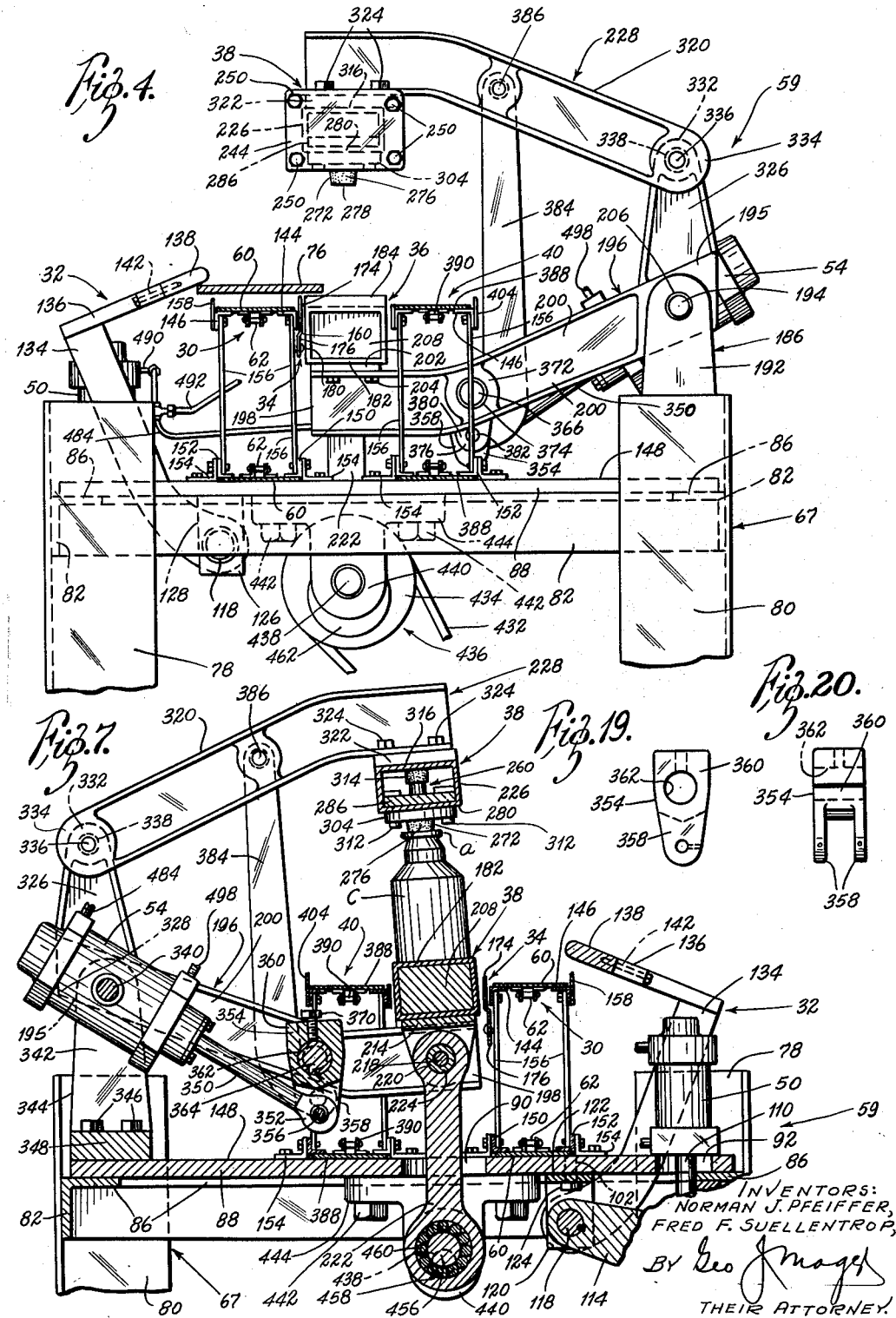

April 29, 1952 N. J. PFEIFFER ET AL 2,594,492
APPARATUS FOR MANUFACTURING WHIPPED CREAM
Filed May 19, 1950 6 Sheets-Sheet 5
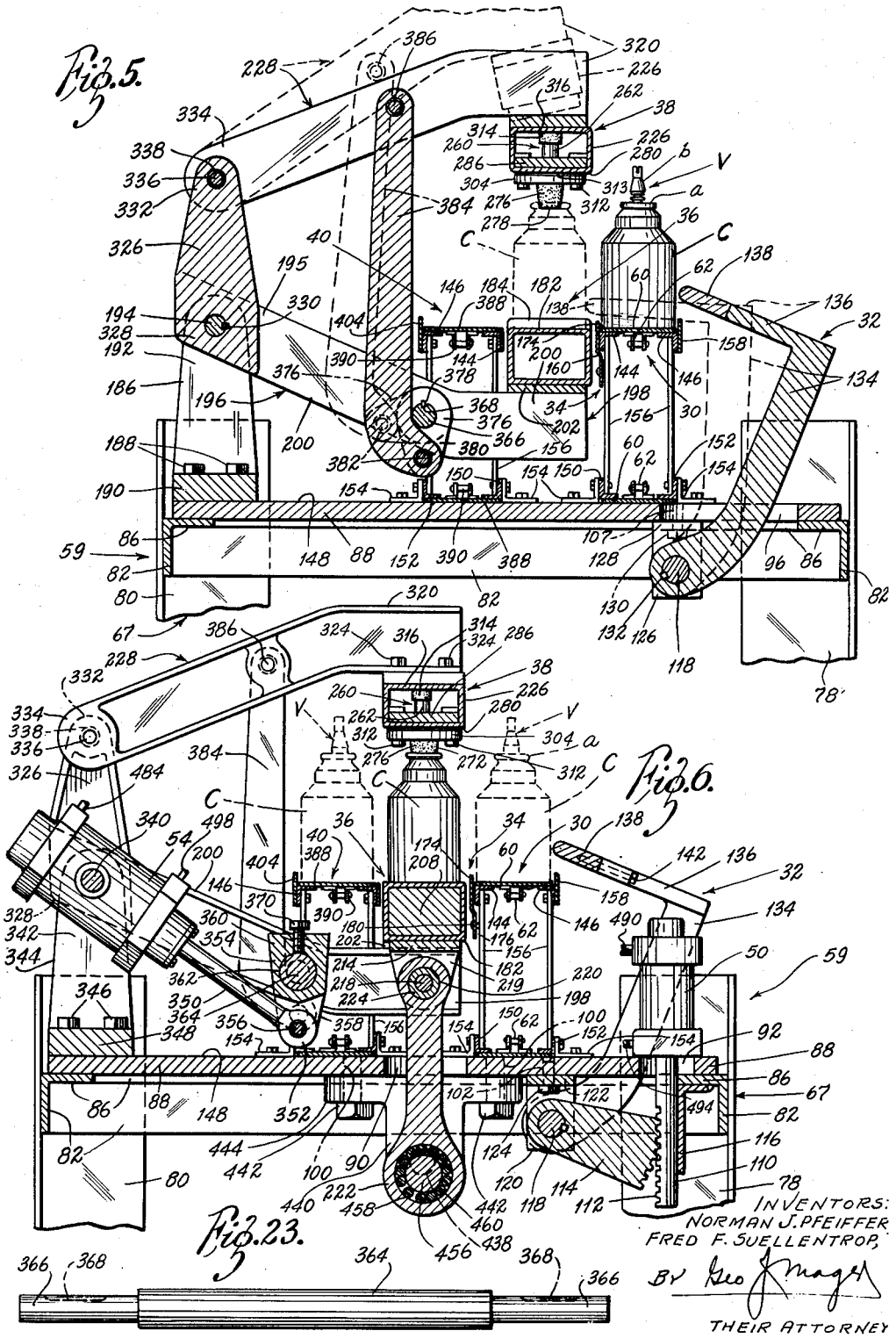

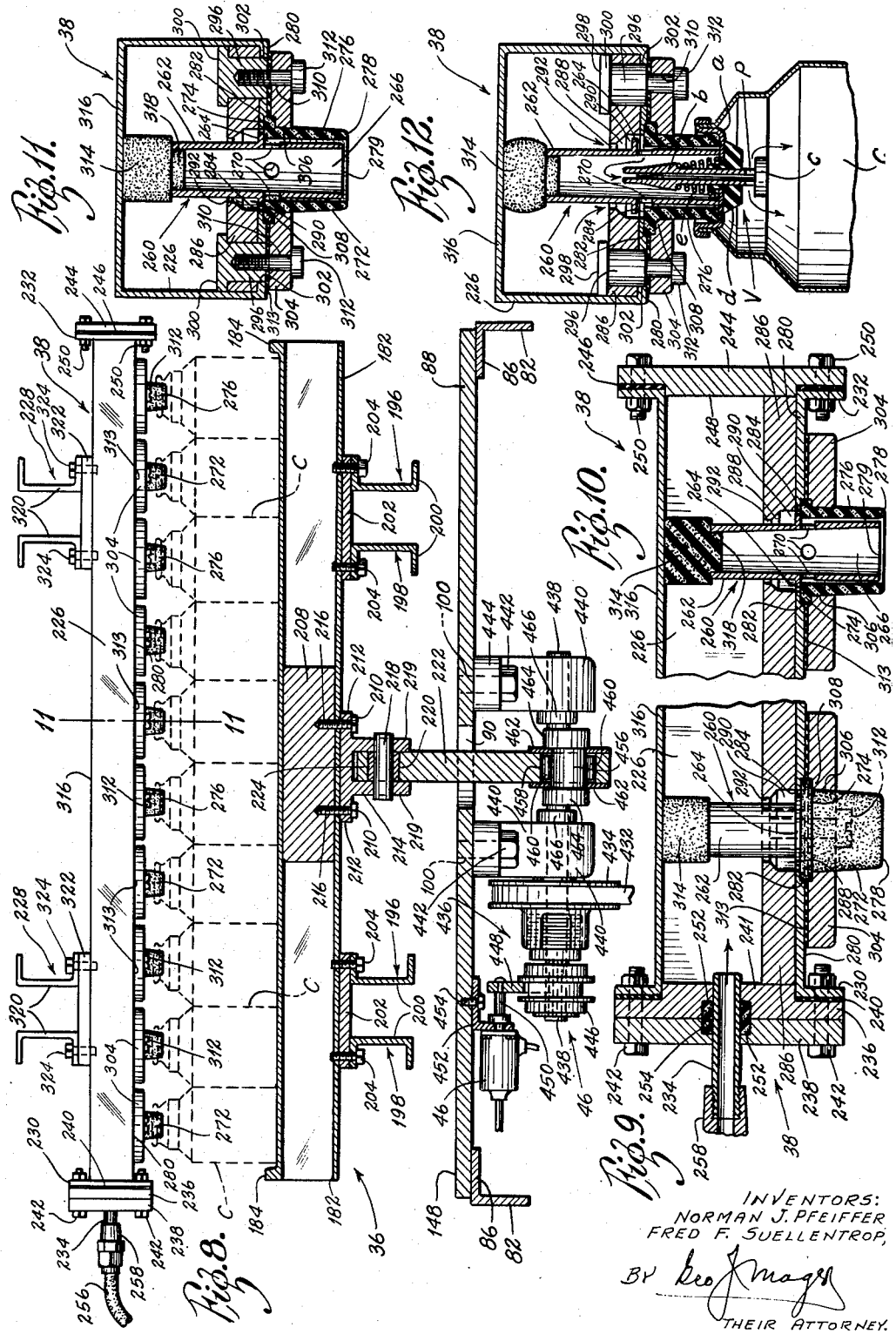

Patented Apr. 29, 1952

2,594,492

UNITED STATES PATENT OFFICE 2,594,492

APPARATUS FOR MANUFACTURING WHIPPED CREAM

Norman J. Pfeiffer and Fred F. Suellentrop, Lemay, Mo., assignors to The Lemay Machine Company, Lemay, Mo., a corporation of Missouri Application May 19, 1950, Serial No. 162,977

12 Claims. (Cl. 226—20)

The present invention pertains generally to the manufacture of whipped cream in handy containers designed primarily for domestic purposes.

That is to say, the invention is directed to apparatus for fluffing or whipping a quantity of pasteurized cream within each of a plurality of self-dispensing containers, simultaneously with the introduction into each container of a gas under specified pressure, as will appear.

In United States Letters Patent No. 2,584,063, issued January 29, 1952, to Fred F. Suellentrop, entitled Apparatus for Manufacturing Whipped Cream, there is set forth in detail a description of the method, and the apparatus employed in practicing the method.

The apparatus disclosed in said patent comprises a machine including a base, a casing, a motor, means for reciprocating a plurality of containers, means for holding the containers, means for injecting gas into each of them simultaneously with the reciprocation thereof, means for starting and stopping the apparatus at the beginning and at the end respectively of a cycle, and so on, all as illustrated and described therein in detail.

A considerable number of these machines have been in daily operation for more than a year at various dairies throughout the land. That these machines have achieved their objectives is attested by the fact that during the past year, millions of cans containing whipped cream manufactured by said machines, have been sold to housewives and others.

The present invention contemplates no critical change in the method set forth in said patent, and is directed solely to improvements in the container-reciprocating and gas-injecting machine therein disclosed.

In other words, the present invention is directed to an apparatus which is automatic, and does not require that the containers be manually placed in position and removed; which does not require the use of trays; which eliminates intermittent starting and stopping operations; which includes means whereby a saving in gas may be had; and which incorporates other novel features and advantages, as will appear.

The dispensing containers herein referred to are of the type described, but not claimed in said patent, and likewise described but not claimed in United States Letters Patent No. 2,505,439, issued to one of the co-inventors of the instant invention on April 25, 1950.

In a general summary, the present invention may be said to include a first continuously operating conveyor for delivering cream containers to the machine; means for transferring a plurality of the containers from said conveyor onto a vertically reciprocable bed member; a retractible barrier strip or container guide, normally positioned between the adjacent edge portions of said conveyor and said bed member; a gas injection assembly adapted to releasably maintain the containers in place during the gas injection and simultaneous reciprocation thereof; a second continuously operating conveyor for transporting or discharging processed containers from the machine; means for transferring processed containers from said bed onto the said discharge conveyor; and means for effecting the various operations sequentially, continuously, and automatically.

The primary object of the invention therefore, is to provide an improved apparatus for manufacturing whipped cream in accordance with the method taught in said Patent No. 2,584,063.

A further object is to provide an apparatus which is automatic in operation, which is highly efficient, and which incorporates novel mechanism adapted to increase production, in that loading and unloading operations do not require intermittent starting and stopping of the motivating means, as will appear.

Other objects and features of the invention will be apparent or pointed out in the more comprehensive description to follow, reference being had also to the accompanying drawings wherein the preferred embodiment thereof is illustrated.

In said drawings:

Fig. 1 is a top plan view of the apparatus comprising the present invention, the end portions of a gas injection manifold being broken away to more clearly present the structure therebelow;

Fig. 2 is a front elevational view thereof;

Fig. 3 is a left end elevational view, partly in section, and on an enlarged scale, being taken as indicated, approximately on line 3—3 of Fig. 1;

Fig. 4 is a similar right end view taken approximately on line 4—4 of Fig. 1;

Fig. 5 is a vertical sectional view taken approximately on line 5—5 of Fig. 1, the scale corresponding to that of Figs. 3 and 4;

Fig. 6 is a similar view taken approximately on line 6—6 of Fig. 1;

Fig. 7 is a view similar to Fig. 6 with certain parts in an alternate position;

Fig. 8 is a view partly in elevation, and partly in vertical section, said view being taken along the line 8—8 in Fig. 3, with elements, which appear in the background, being omitted in the interest of clarity;

Fig. 9 is an enlarged vertical sectional view of the left hand end of the gas injection manifold as the latter appears in Fig. 8;

Fig. 10 is a similar view of the right hand end of said manifold;

Fig. 11 is a transverse sectional view taken on line 11—11 in Fig. 8;

Fig. 12 is a similar view, certain parts being illustrated in operative relation to a valved container which is shown in vertical section;

Fig. 13 is a fragmentary vertical section on a slightly reduced scale, taken on line 13—13 of Fig. 3; and illustrating a container guide plate in elevated or normal position;

Fig. 14 is a similar view illustrating said guide in retracted or lowered position;

Fig. 15 is an enlarged vertical sectional view taken on line 15—15 of Fig. 13;

Fig. 16 is a similar view on line 16—16 of Fig. 14;

Fig. 17 is a fragmentary elevational view of one end of said guide plate;

Fig. 18 is a top plan view of a rectangular base plate included in the apparatus;

Fig. 19 is a side elevational view of a clevis member;

Fig. 20 is a front elevational view thereof;

Fig. 21 is a fragmentary top plan view on an enlarged scale, of one end portion of a can loader bar;

Fig. 22 is a bottom plan view of a portion of the nozzle retainer plate for the gas injection manifold;

Fig. 23 is a view of a rockshaft included in the mechanism for raising and lowering the gas-injection assembly;

Fig. 24 is a top plan view of a gas injection nozzle;

Fig. 25 is a side view thereof;

Fig. 26 is a bottom plan view of a bushing member provided with a square head portion and an internally threaded sleeve portion; and Fig. 27 is a diagrammatic layout of the automatic air control system incorporated in the apparatus.

In Figs. 1 and 2, the apparatus comprising the instant invention is designated as a whole by the numeral 28. It is designed to be interposed between the mechanism employed to introduce a predetermined quantity of cream into the containers, and a cold storage room or the like.

The apparatus includes delivery conveyor mechanism generally indicated at 30; container transfer or loading mechanism generally indicated at 32; retractible container guide mechanism generally indicated at 34; a reciprocable container-supporting bed assembly generally indicated at 36; a gas injection assembly, also reciprocable and generally indicated by numeral 38; discharge conveyor mechanism generally indicated by numeral 40; a motor 42; a cam operated master air control valve assembly generally indicated at 44; a clutch operating mechanism generally indicated at 46; an air metering valve 48; an air pressure operated cylinder 50 associated with said transfer mechanism; an air pressure operated cylinder 52 associated with said container guide mechanism; an air pressure operated cylinder 54 associated with said gas injection assembly; a shut-off valve 56; a gas pressure regulator 58; driving connections, supporting structure, and other elements and parts to be described.

As set forth in detail in the patent aforesaid, a predetermined quantity of high quality pasteurized cream is first introduced into each container, whereupon the latter has affixed thereto a valve assembly of the type also described.

In accordance with the present invention, the containers may now be delivered from the filling station to the processing machine to be described, which incorporates the principal mechanism of the invention, and which is generally indicated by the numeral 59.

The delivery mechanism 30 is generally of conventional construction. It includes a plate type endless conveyor 60, provided on its underside with an endless chain 62, and supported intermediate the filling station and said machine on angle guides or the like 64.

Suitable structure, generally indicated at 66, and welded or otherwise rigidly secured to the framework 67 of said machine, supports the ends of said angles, and one or more standards 68 may be employed to support the angles at intervals between the filling station and the machine, as shown.

The conveyor 60, as appears for example in Figs. 2 and 3, is horizontally disposed, and travels longitudinally across the machine 59 and then around a sprocket wheel 70, rotatably mounted in bearings 72, the latter supported in suitable structure 74, welded or otherwise rigidly secured to the framework 67.

It is here noted that since the supporting assemblies 66 and 74 may be constructed in any conventional manner, inclusion of them in views other than Figs. 1 and 2 has been dispensed with in the interest of clarity and reduction of illustration.

As shown in Figs. 1 and 4, an abutment or can stop member 76 is provided, which extends across the conveyor in vertical spaced relation thereto, for a reason to appear.

The framework 67 of the machine 59, includes a pair of front corner standards 78 and a pair of rear corner standards 80 secured together by front, rear, and side angle rails 82 near their upper ends, and by similar angle rails 84 near their lower ends.

The standards 78 and 80 are also of angular cross-section, and all of the structural members named are welded together to provide the rigid skeleton framework 67, which as shown, supports all of the mechanism included in the machine 59, as well as the delivery conveyor supporting assemblies 66, 74, and similar assemblies for the discharge conveyor, as will appear.

Supported on, and welded to the inturned flange portions 86 of the upper angle rails, is a rectangular base plate 88, shown per se in Fig. 18. On the transverse center line and approximately centrally of said plate, there is provided a relatively large circular opening 90, and adjacent the front margin of the plate, a small opening 92. Also formed in said plate, are a pair of spaced elongated slots 96, a series of threaded apertures 98 about opening 92, a series of threaded apertures 100 about opening 90, and a pair of similar apertures 102 intermediate said openings.

Adjacent its rear marginal edge, plate 88 is provided centrally with a series of threaded apertures 104, and in alinement with each slot 96, has formed therein a series of threaded apertures 106. A threaded aperture 107 is also provided adjacent each slot 96, as shown.

The loading mechanism 32 includes the air cylinder 50 which, as shown particularly in Fig. 1, is mounted on plate 88 by means of tap bolts 103 passing through a flange on the cylinder into engagement with the apertures 98. The air cylinder 50 is of conventional design, as is understood, and includes a vertically reciprocable piston not shown, and a depending piston rod 110, the latter as seen in Fig. 6, extending freely through opening 92 of said base plate 88.

A rack 112 formed in said piston rod, is maintained in constant engagement with a segmental gear 114 by means of an angular bracket 116, rigidly secured as by welding or otherwise, to flange 86 of front rail 82.

Segmental gear 114 is keyed to a horizontal rock shaft 118 between the depending leg portions 120 of an inverted U-shaped bearing member 122, which rotatably supports said shaft, and which is rigidly mounted on the underside of the plate 88 by means of tap bolts 124 which engage the apertures 102.

Each end portion of shaft 118 is rotatably supported in the depending leg portion 126 of an angular bearing member 128, the latter rigidly mounted on the underside of plate 88 by means of tap bolts 130 which engage the apertures 107.

Rigidly secured to the rock shaft 118, as by keys 132 or otherwise, is a pair of longitudinally spaced rocker arms 134 each terminating at its free upper end in a rearwardly projecting flange portion 136, the configuration of which will be apparent from an inspection of Figs. 1 and 3. As best seen in Fig. 5, each arm 134 extends through one of the elongated slots 96 in base plate 88, and normally occupies the position portrayed in said view.

The machine 59 illustrated, is designed to simultaneously process ten containers, so that a loading bar 138, shown on an enlarged scale in Fig. 21, is provided with ten arcuately formed and equally spaced recesses 140, each adapted to engage a peripheral portion of one container C, as will appear. The bar 138 is supported by the arms 134, being secured to the flange portions 136 of the latter by cap screws 142 as shown, or otherwise.

From the foregoing, it should be manifest that the rock shaft 118, rotatably supported in the central bearing member 122 and the end bearing members 128, can shift the loading bar 138 from its Fig. 5 full line position to the broken line position thereof shown in said view, whenever piston rod 110 is raised.

As hereinbefore noted, the plate-type delivery conveyor 60 travels across the machine 59 in a horizontal plane, and means are provided to support the upper stretch thereof between the supporting structure 66 and the sprocket 70, mounted in supporting structure 74.

Included in the means referred to, is a pair of transversely spaced angle rails 144 and 146. On the upper surfaces of the horizontally disposed flanges of these rails, the plates of conveyor 60 are slidably supported as shown in Figs. 5, 6, and other views. The rails 144 and 146 are preferably coextensive longitudinally from the left to the right end of said machine, so that the said upper stretch of conveyor 60 is definitely maintained in a horizontal plane.

After the upper stretch of said conveyor has travelled around sprocket 70, it becomes the lower stretch as is understood. As such, it slides along the upper surface 148 of plate 88, and beneath the lower surfaces of the horizontally disposed flanges of angle rails 150 and 152. These rails are also preferably coextensive longitudinally from the left to the right end of machine 59.

Rails 150 and 152 are rigidly mounted on base plate 88 by means of angular brackets 154, as shown in the drawings. Obviously, these brackets may be welded to said base plate if desired, instead of being bolted thereto as portrayed.

In other words, the said rails 150 and 152 are rigidly maintained in position slightly above the upper surface 148 of base plate 88, whereby the plates of conveyor 60 may travel slidably between them and the upper surface aforesaid of said base plate.

As illustrated in the drawings, the angle rails 144 and 146 are supported in position by a plurality of perpendicular struts 156, the upper ends of which are welded or secured as shown to said rails, and the lower ends of which are similarly secured to the rails 150 and 152. Welded, or otherwise permanently attached to front rail 146, is a guide or retainer plate 158, the upper end of which projects above the plane of the plate conveyor 60, so that the containers C are maintained in alinement, as is understood. The retractible container guide mechanism 34 serves the same purpose along the opposite or rear edge of said conveyor.

With particular reference to Figs. 13 through 17, the mechanism 34 is seen to be mounted on the four rear struts 156.

Included in said mechanism are a vertically movable guide plate 160; the aforesaid air cylinder 52; a suitable supporting bracket for the latter designated 162; a reciprocable piston rod 164 operable by said cylinder; a head 166 rigid with the outer end of said piston rod; and a link 168, one end of which is pivotally connected as at 170 to said head, the other end of which is pivotally connected as at 172 to the plate 160.

The configuration of guide plate 160 in vertical section, is best seen in Figs. 15 and 16. In these views, it is noted that the upper portion 174 of said plate is offset with respect to the lower portion 176 thereof, and normally projects above the plates of the conveyor 60, as in Figs. 13 and 15, to cooperate with the guide 158 in maintaining oncoming containers C in alinement.

In the embodiment of the invention illustrated, four struts 156 are provided for supporting the rail or track 144. To one of these strut members is secured the supporting bracket 162 for air cylinder 52, as shown in Figs. 13 and 14. The lower portion 176 of guide plate 160 is provided with a series of spaced angularly disposed elongated slots 178, through each of which passes the shank portion of a headed screw 180 which engages a threaded aperture provided in each of said strut members.

Thus it should be apparent that plate 160 is movably maintained in vertical position through the cooperation of the screws 180, slots 178, and the pivotal connection 168.

The assembly 36, which supports a plurality of containers immediately prior to, during, and immediately subsequent to a processing cycle, will now be described with particular reference to Figs. 3 through 8.

The bed member of this assembly is in the form of a rectangular tube 182 provided at either end with an upwardly projecting abutment 184, which may be integral therewith as shown, or otherwise secured to the upper surface of said tube.

Mounted adjacent the rear marginal edge of base 88, is a pair of spaced U-shaped bearing brackets 186 secured thereto by tap bolts 188 which pass through the horizontal web portion 190 of each bracket into engagement with the threaded apertures 106.

Pivotally mounted between the upstanding leg portions 192 of said brackets, on horizontally disposed pivots 194, are the rear end portions 195 of a pair of composite arms 196, the free end portions 198 of which are normally horizontal, and are disposed beneath the container supporting tube 182.

As especially seen in Fig. 8, each of the arms 196 is comprised of a pair of spaced similar channel-shaped members 200, rigidly united beneath said tube and secured thereto by means of plates 202 and tap screws 204, as shown. Bronze bearing sleeves 206 are preferably provided for the rotary shafts 194, in the leg portions 192 of each bracket 186.

In order to reinforce the tube 182, a preferably solid block member 208 is inserted thereinto, and maintained in position centrally thereof, by cap screws 210 which pass through the lateral flanges 212 of a wrist pin connection 214, through the bottom wall of said tube, and thence into engagement with threaded apertures 216 provided in said block, as is clearly illustrated in Fig. 8.

Numeral 218 designates a wrist pin, press-fitted as shown, or otherwise permanently mounted in the spaced depending portions 219 of said member 214. Pin 218 passes through a circular opening 220 provided in the upper end portion of a connecting rod 222 which is reciprocable vertically as will appear, and which projects downwardly through opening 90 in base plate 88. Needle bearings are preferably interposed about the wrist pin in the opening 220, although because of illustrative limitations, a bearing sleeve 224 is shown in the drawings.

The gas injection assembly 38 is illustrated particularly in Figs. 8 through 12, and attention is directed also to Figs. 24 through 26.

Included in this assembly is a manifold 226, secured to the free ends of a pair of horizontally spaced composite arms each, generally designated by numeral 228. The left end of manifold 226 terminates in a peripheral flange 230, and the right end in a similar flange 232.

Obviously, since gas under pressure of 90 pounds per square inch is supplied to the manifold as will appear, it is requisite that said manifold be sealed against leakage, or fortuitous escape of the gas. It is also evident that a seal should be provided about the delivery tube 234 whereby the gas is introduced into the manifold.

Thus, the left end of the manifold is sealed by means of a first closure plate 236, a second closure plate 238, and a resilient gasket 240, the latter being interposed between plate 236 and flange 230. The last named plate is provided with a plug portion 241 which projects into the interior of the manifold, and by means of nut and bolt assemblies 242, said plates and gasket are drawn tightly against the flange 230 to effect a positive seal, as should be apparent.

The right end of the manifold is sealed by means of a closure plate 244 and a resilient gasket 246, the latter being interposed between said plate and flange 232. Plate 244 is provided with a plug portion 248 which projects into the interior of the manifold, and by means of nut and bolt assemblies 250, the plate and gasket are drawn tightly against flange 232 to effect a positive seal at this end of the manifold.

In order to effectively seal the alined openings provided in plates 236 and 238 for the delivery tube 234, the contacting face portions of said plates are recessed at 252, to receive and compress about said tube an annular sealing sleeve 254 of resilient material.

Gas is supplied to the tube 234 by means of a flexible conduit 256 leading from a source of supply. A suitable fitting 258 serves to connect said tube and conduit.

Manifold 226 carries a plurality of spaced injection nozzles each generally designated by numeral 260. In the embodiment of the invention illustrated, ten such nozzles are provided. A top plan view of one of them is portrayed in Fig. 24, a side elevational view thereof in Fig. 25.

Each nozzle 260 includes a tubular upper portion 262, an annular laterally projecting flange portion 264, a tubular lower portion 266, and an intermediate tubular portion 268 of slightly smaller external diameter than portion 266. The reduced portion 268 of the nozzle, has formed therein one or more horizontal ports 270, four being shown as preferable.

Numeral 272 indicates a slightly tapered or funnel-shaped member of resilient material, preferably rubber. It includes an annular flange portion 274, a skirt portion 276, and a rounded lower marginal edge portion 278 which normally extends slightly below the corresponding edge 279 of nozzle 260, as appears in Figs. 10 and 11.

It is also noted with reference to these views as well as to Figs. 9 and 12, that the bottom wall 280 of manifold 226 has formed therein a longitudinal series of equally spaced annular recesses 282 to accommodate the flanges 274. Also formed in said wall is a similar series of circular openings 284 concentric with said recesses, as shown.

In Fig. 22, the left hand portion of a nozzle retainer plate 286 is shown in bottom plan. Said plate extends from end to end of the manifold 226, and rests upon the bottom wall 280 thereof, as appears to best advantage in Figs. 9 and 10.

Provided in plate 286, is a longitudinal series of equally spaced annular openings 288 which are so formed as to include lower portions 290, the diameters of which coincide with those of the openings 284, and upper portions 292 the diameters of which are greater than the external diameters of nozzle portions 262.

On the transverse centerline of each opening 288, plate 286 has formed therein two spaced circular apertures 294, each adapted to snugly receive the internally threaded sleeve or shank portion 296 of a bushing 298, shown particularly in Fig. 26, to have a square head portion 300.

Reverting to Figs. 9, 11, and 12, it is noted that the bottom wall 280 of the manifold 226 is correspondingly apertured on the transverse centerline of its openings 284, as at 302, so that the lower marginal portions of the bushings 298 extend therethrough as shown.

A clamping ring 304 is associated with each of the nozzles 260. Centrally thereof, each of said rings is provided with an opening 306 in alinement with a recess 282 in the wall 280, so that annular flanges 274 of members 272 rest upon shoulders 308 and extend into said recesses, as shown.

The skirt portions 276 extend through and downwardly beyond openings 306, and each clamping ring is provided with a pair of diametrically opposed holes 310.

By means of cap screws 312, the threaded shank portions of which pass through said holes and into engagement with the bushings 298, the clamping rings 304 are removably maintained in place, while at the same time, resilient flanges 274 are compressed, as is understood, so as to form a seal about each opening 306 for preventing leakage. Leakage about bushings 298 is prevented by the interposition of an annular gasket 313 between each clamping ring 304, and the bottom wall 280, as shown.

Each opening 284 is slightly larger in diameter than flange 264 of the nozzle, and the upper surface of member 272 projects inwardly beyond the inner wall of said opening. Normally, the gas pressure in manifold 226 forces the flange 264 tightly against the exposed adjacent surface of member 272, so that escape of gas is effectively prevented.

Another positive force is normally directed against the nozzle 260 and therefore the flange 264, by the resiliency inherent in a rubber plug 314 which is interposed between the top wall 316 of the manifold, and the upper end portion 262 of said nozzle. Displacement of plug 314 is obviated by the provision of an integral reduced extension 318 thereon, which projects a short distance into the nozzle, as shown. Obviously also, plug 314 seals the upper end of the nozzle against escape of gas therethrough.

With particular reference now to Figs. 1, 2, and 8, each of the arms 228 comprises a pair of spaced, similar channel-shaped members 320, each pair being rigidly connected together by means of a plate 322, and tap screws 324 which engage threaded apertures provided in the top wall 316 of the manifold. With this arrangement, it should be apparent that the manifold 226 is rigidly secured to and supported by the free end portions of arms 228.

With reference especially now to Figs. 3 through 7, numerals 326 designate a pair of vertically disposed links of the configuration shown. The lower portion 328 of each link is disposed between, and embraced by, a pair of rear end portions 195 of the arms 196 included in assembly 36. Pivot pin 194 also passes through said link, and the latter and said arms are rigidly secured together by any suitable means, a key 330 being illustrated.

The upper ends 332 of said links, are each disposed between and in contact with the rear end portions 334 of the pair of arms 228, a pivot pin 336 passing through said link and said arms. Preferably, a bearing sleeve 338 is interposed in the link about said pin.

From the foregoing, it should be evident that the links 326 are movable with, but not relative to the arms 196, and that the rear end portions of the arms 228 have pivotal connections with said links.

The mechanism for alternately effecting the rise and descent of the gas injection assembly 38, is operable by air cylinder 54. As appears to best advantage in Figs. 1, 6, and 7, said cylinder is rotatably mounted by means of trunnions 340, which project from opposite sides thereof and are supported in the upstanding leg portions 342 of a U-shaped bracket 344. This bracket is attached to base plate 88 by means of tap bolts 346, which pass through the horizontal web portion 348 of said bracket and into engagement with the threaded apertures 104.

Air cylinder 54 is of conventional design, and includes a piston which is not shown, and a piston rod 350, which projects therefrom. To the free extremity of said rod, there is welded or otherwise rigidly secured an eye or bearing member 352, which has a pivotal connection with a clevis 354, the latter shown per se in Figs. 19 and 20.

The connection referred to comprises a pivot pin 356 passing through said eye member and having its opposite ends secured in the depending leg portions 358 of said clevis. The body portion 360 of the clevis is undercut, as shown, to accommodate reciprocal movements of the eye 352, and is provided with a horizontal bore 362 adapted to snugly receive the central portion of a horizontally disposed rock shaft 364.

Said rock shaft is shown per se in Fig. 23, where it is seen to include end portions 366 the diameters of which are reduced relative to the intermediate portion, and are provided with keyways 368 for a purpose to appear. The clevis 354 is rigidly secured to said shaft by a set screw 370.

Each of the aforesaid channel-shaped members 200 is provided with a boss portion 372, and these serve as bearings for the reduced ends 366 of the rock shaft, a bushing 374 being preferably provided in each of said bearings.

Adjacent the inner vertical faces of each pair of spaced members 200, there is a link 376 secured by a key 378 which engages the keyway 368 in the rock shaft and a complementary keyway in each link. If desirable, the spaced links 376 may be welded to the shaft instead of being keyed thereto. The depending free end 380 of each link, has a pivotal connection 382 with the lower end of a vertically disposed lever 384, of the configuration best seen in Figs. 1 and 5.

There are two levers 384, and each of them also has a pivotal connection 386 at its upper end with one of the composite arms 228. It is noted from an inspection of Fig. 8, that the spaces obtaining between the inner faces of members 200 of the container bed supporting arms 196, are wider than those obtaining between the inner faces of members 320 of the manifold supporting arms 228.

With this arrangement, whereas the end faces of the upper extremities of levers 384 slidably contact the opposed vertical surfaces of members 320, sufficient clearance is provided between the end faces of the lower extremities thereof to accommodate the links 376.

The discharge mechanism 40 is also generally of conventional construction. It includes a plate type endless conveyor 388, provided on its underside with an endless chain 390, and supported intermediate a pair of standards 392 and the machine 59, by angle guides or the like 394.

Suitable structure, generally designated 396, welded or otherwise rigidly secured to framework 67 of said machine, supports the left ends of said angles as shown in Figs. 1 and 2.

The conveyor 388, as appears for example in Figs. 1 and 3, is horizontally disposed, and travels longitudinally across machine 59 after passing around a sprocket wheel 398, rotatably mounted in bearings 400, the latter supported in suitable structure 402, welded or otherwise rigidly secured to framework 67.

As in the case of the delivery mechanism, it is noted that since the supporting assemblies 396 and 402 may be constructed in any selected manner, inclusion of them in views other than Figs. 1 and 2 has been dispensed with, in the interest of clarity and reduction of illustration.

It is also here noted that the supporting structure for the discharge conveyor, as it travels longitudinally across the machine 59, is similar to that which supports the delivery conveyor.

Therefore, the same reference characters have been applied to corresponding parts, with this exception, that the guide plate which corresponds to guide plate 158, and serves as an abutment to maintain in alinement on conveyor 388, the processed containers C transferred onto said conveyor in the manner to be described further on, is designated 404.

The conveyor 388 is driven by any suitable motive means provided at the discharge end thereof, it being deemed not necessary to illustrate or describe said means. It is noted however, that the present invention provides an arrangement whereby, when the said motive means drives conveyor 388 to the right as indicated by the arrow A in Fig. 1, conveyor 60 is also driven in the same direction as indicated by arrow B.

Accordingly, the shaft 406, which supports sprocket 70, is extended beyond its forward bearing 72, and has affixed thereto a second sprocket 408 about which is trained an endless chain 410.

The standards 392, fixed to a floor surface by bolts 412, or otherwise, have secured thereto as shown, bearings 414 and 416 which rotatably support a horizontally disposed shaft 418. Rigidly secured to this shaft is a sprocket 420, in constant engagement with the upper and lower stretches of chain 390.

Evidently therefore, as the upper stretch of conveyor 388 is propelled to the right as arrow A indicates, shaft 418 is caused to rotate in a clockwise direction. Said shaft projects forwardly beyond the elongated supporting portion of bearing 416 as shown, and has affixed thereto a sprocket 421 around which endless chain 410 is trained. Thus, as arrow B indicates, the upper stretch of conveyor 60 is simultaneously propelled to the right.

It is noted at this time however, that whereas the activation of both the delivery and the discharge conveyors by means of a single source of power is considered desirable, such motivation is not critical. In other words, it is to be understood that if desired, each conveyor may be independently driven.

In production, motor 42 operates continuously. It is mounted on a suitable platform 422 supported on flat bars 424, the latter welded or otherwise secured to the horizontal flanges of the end angle rails 84.

With reference to Figs. 2 and 3, there is rigidly attached to motor shaft 426 a first pulley 428, and a second pulley 430. The first pulley 428 has a driving connection 432 with the thus continuously rotating cup member 434 of a standard friction disc type clutch generally indicated by numeral 436, and best seen in Fig. 8. The driving cup 434 is freely rotatable on a shaft 438 supported in spaced hanger bearings 440. These bearings are mounted on the underside of base plate 88 by means of bolts 442, which pass through the outstanding flanges 444 of said bearings and engage the threaded holes 109 in said plate.

The driven member 446 of the clutch is axially movable on the splined left end of said shaft, by means of a shifter 448 which is fixed to the projecting end of the piston rod 450 of air cylinder 46.

Air cylinder 46 is of standard design, and contains a piston which is not shown, but which is secured to the other end of the rod 450, as is understood. The cylinder is supported by an angle bracket 452 attached to the underside of plate 88 by bolts 454, as shown.

With reference to the clutch assembly 436, it is not believed necessary to describe same in detail, since its construction is standard, and its operation well understood. Suffice it to say, that when piston rod 450 is caused to move to the right, rotary motion is imparted to shaft 438. Conversely, with piston rod 450 to the left, the position it occupies in Fig. 8, shaft 438 is not being driven. Although not illustrated in the drawings, roller or ball bearings are provided for said shaft in the hangers 440, to insure smooth performance.

Intermediate the bearing hangers 440, shaft 438 has formed thereon an eccentric or crank pin 456, which passes through a circular opening 458 in the bottom end of connecting rod 222. An annular series of small roller bearings 460 is provided, the bearings being maintained in place by suitable retainer discs 462 interposed between the end faces of the connecting rod, and annular shoulder portions 464 integrally formed on the shaft 438.

End play of this shaft is prevented by other annular shoulder portions 466, integrally formed therewith, and which are in contact with the inner faces of the bearing hangers, as shown.

Reverting now to Figs. 2 and 3, the second pulley 430 on motor shaft 426, has a driving connection 468 with a combined speed reducer and transmission device generally designated 470, which is mounted on the motor platform 422. This device is of conventional design, and has therefore not been illustrated in detail. The input shaft thereof, designated 472, obviously rotates continuously at motor speed. The output shaft 474 however, rotates at a predetermined reduced rate of speed, which will be seen to be two revolutions per minute.

Rigidly secured to the projecting end of output shaft 474, is a plate cam, the peripheral edge 476 of which is circular for approximately three hundred degrees, the remaining sixty degrees of said edge being extended to provide a cam lobe 478.

As will appear, this cam activates the master valve 44, which is of standard construction and will not therefore, be described in detail. It is mounted on motor platform 422 adjacent the right front corner thereof. The operating stem 480 of said valve is horizontally disposed, and suitable linkage 482 is provided for activating said stem in response to the rotary movements of cam 476.

As it appears in the drawings, a roller 483 is included in linkage 482, said roller being maintained in contact with the peripheral edge of cam 476 at all times by suitable means. The means illustrated in Fig. 2 comprise a disk 479 rigidly secured to the projecting end of the valve stem 480, and a compression spring 481 interposed about said stem between said disc and the valve housing.

The automatic air control system is diagrammatically illustrated in Fig. 27. For identification purposes in the description of operation to follow further on, reference numerals have been applied to the various conduits included in the system as follows: air pressure delivery line 482; trunk air lines 484 and 486; branch lines 488, 490, and 492 in fluid communication with line 484; and branch lines 494, 496, and 498 in fluid communication with line 486.

Before entering into the description of operation, it is deemed advisable to briefly describe the container C, which is shown in Fig. 12 to include a dispensing valve assembly generally indicated V. The elements included in this assembly are cup shaped and centrally apertured closure *a*, hollow tubular stem *b* terminating in an enlarged flange portion *c*, rubber grommet or sealing element *d*, and a light compression spring *e*. Immediately above flange *c* stem *b* is provided with a plurality of ports *p* in communication with its hollow interior. Normally, spring *e*, interposed between a shoulder on stem *b* and the horizontal wall of closure *a*, maintains said stem in elevated position, so that the ports aforesaid are surrounded by said grommet.

With this arrangement, it is only by means of the application of pressure from without, that fluid between the interior of the container and atmosphere may be established.

Operation

It is understood that the containers C being delivered to machine 69 via conveyor 60 contain the proper quantity of pasteurized cream at a temperature of 38 degrees Fahrenheit. It is also understood that the gas delivered to manifold 226 via line 256 is a mixture of approximately 85 per cent nitrous oxide, and 15 per cent carbon dioxide at approximately 90 pounds pressure.

Further, it is assumed that air under pressure, with valve 56 open, is being delivered to the master valve 44; that both conveyors 60 and 388 are simultaneously being driven longitudinally across the machine to the right; that motor 42 is not operating; and that the position of cam 476 is such that lobe 478 is about to contact roller 483.

The leading container C of the incoming row having reached the abutment 76, succeeding containers are brought into contiguous relation relative to one another, as the plate conveyor 60 slides beneath those which have become stationary, as is understood.

With the cam lobe 478 in the position indicated, air under pressure is being supplied via the master valve to conduit 484, and simultaneously to the branches 488, 490, and 492 thereof.

Thus at this time, each of the piston rods 350, 450, 110, and 164 is in its extended position. As a result, manifold 226 occupies the position shown for example in Figs. 3 and 4; slidable member 446 is operatively connected with driving member 434 of clutch 436; segmental gear 114 maintains the loading mechanism 32 in the position shown for example in Figs. 3 and 4 also; and container guide plate 160 is being maintained in its elevated position, as depicted for example, in Figs. 3, 4, and 15.

As previously indicated, the embodiment illustrated is designed to process ten containers per cycle of operation. To this end, the ten arcuate recesses 140 of loader bar 138 are so spaced that each of them will engage a peripheral portion of one container C, when rocker arms 134 are caused to move from the full line to the broken line position portrayed in Fig. 5. Guide plates 158 and 160 maintain the ten containers in longitudinal alinement on conveyor 60.

It is here noted that a cycle is completed in approximately thirty seconds, so that the apparatus disclosed, when in continuous operation, will process twenty containers per minute. That is to say, cam 476 is so designed that reciprocatory agitation of the containers simultaneously with the injection thereinto of the gas, requires approximately twenty-five seconds, and loading operations require approximately five seconds.

Assuming now that a switch, not shown, is manipulated to energize motor 42, cam lobe 478, which incidentally rotates in a counterclockwise direction, engages roller 383 to move valve stem 480 to the left, which action cuts off the air pressure supply to conduit 484, and transfers it to conduit 486.

As a result, air pressure is supplied via master valve 44 to said conduit 486, and simultaneously to the branch lines 494, 496, and 498 thereof.

Consequently, each of the piston rods 350, 450, 110, and 164 is withdrawn from its extended to its retracted position, as is understood. In the course of a time elapse equivalent to five seconds, said piston rods, respectively associated with air cylinders 54, 46, 50 and 52, raise manifold 226 to the position shown in broken lines in Fig. 5; disengage clutch 436; rotate segmental gear 114 to bring the loading mechanism 32 to the broken line position thereof shown in Fig. 5; and retract or lower guide plate 160 to the position thereof shown in Figs. 14 and 16.

Since all of these results are obtained in the space of five seconds, the action would seem to be simultaneous. There is however, a definite sequence in the action of said cylinders, and in this connection, reference to Fig. 26 should be helpful.

The air system is so arranged that during the time in question, the following sequence of operations takes place: cylinder 46 "kicks out" the clutch; immediately thereupon, cylinder 54 causes manifold 226 to rise; while the latter is rising, cylinder 52 lowers the guide plate 160; and thereupon, cylinder 50 activates the loading mechanism 32.

It is noted, as appears for example in Fig. 5, that at this time, the upper surface of bed member 182 is horizontally disposed and flush with the upper surfaces of the conveyors 60 and 388.

This result is obtained by the predetermined distribution of weight in the agitation mechanism. With reference for example to Fig. 6, it is noted that the lower end portion 222 of the connecting rod is heavier than the upper end. It is also seen in Fig. 8, that eccentric 456 is of greater diameter than the remainder of shaft 438. The free ends 198 of the pivotally mounted arms 196, block 208 and so on, all tend to normally cause the bed member 182 to come to rest in its Fig. 6 position, instantaneously after the clutch is thrown out, as is understood.

Now, as the loading mechanism moves rearwardly, that is to the left as viewed in Fig. 5, each of the recesses 140 of bar 138 engages one of the ten containers C, whereby all ten of them are simultaneously transferred onto stationary bed plate 182. The stroke of arms 134 is definitely limited by the movement of piston rod 110, so that the containers C are moved from the full line position to the broken line position thereof, and no farther. To obviate longitudinal disalinement of the ten containers, the abutments 184, best seen in Fig. 8, are provided.

Instantaneously following the completion of the loading stroke, cam lobe 478 passes beyond roller 483 whereupon valve stem 480 automatically moves to the right. This action cuts off the air supply to conduit 486, and transfers the pressure to conduit 484, whereupon in the order named, cylinder 54 lowers manifold 226 into the position shown for example in Figs. 6 and 12; cylinder 52 raises the guide plate 160; cylinder 50 simultaneously withdraws the loading mechanism 32; and cylinder 46 effects engagement of the clutch 436.

That is to say, with reference to clutch engagement, it becomes effective immediately after the recessed edge of loading bar 138 arrives at a position above conveyor 60.

In order to produce quick clutch disengagements, but delayed clutch engagements, the control or metering valve 48 is provided in branch line 488 of main conduit 484. Since no claim is made to this valve as such, the construction thereof has not been illustrated. However, the valve is of the type designed to automatically provide for full and free flow in one direction, and restricted flow in the opposite direction.

In other words, at such times when line 488 is functioning as a pressure line, the flow of air is restricted; when functioning as an exhaust line, the flow is unrestricted. The reason for this arrangement will become apparent hereinafter.

The manner in which the four air cylinders effect the movements thus far described, should be apparent from the drawings, but a brief description thereof will now be given.

Thus, cylinder 46 alternately extends and withdraws its piston rod 450 to move clutch shifter 448 from left to right and vice versa. Cylinder 54 alternately extends and withdraws its piston 350, to partially rotate clevis 354 in a counterclockwise, then in a clockwise direction. The limit of clevis travel in either direction is the same as that of the links 376, which are rigidly secured to rock shaft 364, as is said clevis.

In other words, a comparison of the full line position of pin 382 with the broken line position thereof in Fig. 5, will provide the answer. The actual raising and lowering of arms 228, and therefore of manifold 226, is by way of levers 384 as Fig. 5 also clarifies.

Cylinder 50 alternately extends and withdraws its piston rod 110 to rock the shaft 118 in a clockwise, then in a counterclockwise direction, by means of rack 112 on the rod, and segmental gear 114 fixed to said shaft, as seen in Fig. 6. This motion is transmitted to arms 134, which are, as shown in Fig. 5, also fixed to shaft 118.

With particular reference to Figs. 13 through 17, cylinder 52 alternately extends and withdraws its piston rod 164 to elevate and then lower guide plate 160. The head 166, the pivoted link 168, and the mounting of the guide plate on stationary pins 180 which project through angular slots 178, provides an arrangement adapted to prevent any binding or cocking of the parts, so that the guide 160 operates smoothly.

Reverting now to that point in the operation at which manifold 226 descends onto the ten containers alined on the bed member, attention is directed to Figs. 8 through 12, particularly the last named. The action will be described with reference to a single container, it being understood that all the containers are processed in identical fashion.

As the skirt portion 276 of resilient member 272 enters the cavity in closure a, the bottom peripheral edge 278 thereof first contacts the horizontal wall of said closure, and then becomes slightly deformed so as to speak, in that it is squeezed into the annular cavity, as may be clarified by comparing Figs. 11 and 12.

Instantaneously thereafter, bottom edge 279 of nozzle 260 strikes said closure wall and envelopes the upwardly projecting elements of the valve assembly V. An almost imperceptible further movement, brings the manifold to the end of its downward travel. By this action however, nozzle 260 is forced upwardly slightly, against the resiliency of plug 314.

As the nozzle is thus forced upwardly, its flange 264 is also raised from its sealing seat atop flange 274, to thus place the ports 270 in fluid communication with the interior of the manifold. Now the gas, under pressure of approximately ninety pounds per square inch, quickly enters and fills the nozzle via annular opening 288 in retainer plate 286, and ports 270. Passing downwardly through hollow valve stem b, the gas strikes head c to depress said stem and uncover the ports p immediately thereabove.

Thus the gas is injected into the container as indicated by arrows. The seal provided by the deformation of bottom edge 278 of member 272, prevents any escape of gas during this operation.

At the precise moment that manifold 226 attains its downmost position, air cylinder 46 moves piston rod 450 to the right to cause clutch engagement. Thereupon, rapid reciprocation of the ten containers is initiated and continues for approximately twenty-five seconds.

Thus the original turbulence engendered by injection of the gas is continued by the rapid reciprocation of the containers for that length of time.

Obviously, the time factor is important because it has been ascertained by tests, that ideal fluffing of the cream under action of the present apparatus, is attained in approximately twenty-five seconds. It is to be understood of course, that variations of one second are not critical, but it is noted that agitation for more than twenty-seven seconds is apt to churn the cream into butter.

Therefore, after the elapse of approximately twenty-five seconds, cam lobe 478 has again moved to a position wherein it is about to contact roller 484, thus completing the first cycle of operations.

Apparently, conveyor 60 has, during the reciprocating period, lined up another ten containers in preloading position, as the container C shown thereon in broken lines demonstrates in Fig. 6.

Now, as the cycle of operations previously explained is repeated, the ten containers alined on said conveyor 60 are loaded onto bed member 182, displacing the processed containers which are simultaneously transferred to discharge conveyor 388.

In other words, it is considered prolix to elaborate further on the operation of the apparatus, other than to state that after the initial cycle, succeeding cycles are similar in every respect, except that ten delivered containers C are successively interposed between the bar 138 and the processed containers to automatically effect the transfer of the latter from bed 182 onto discharge conveyor 388.

Processed containers are stored, or shipped as the case may be, under temperature conditions not exceeding approximately thirty-eight degrees Fahrenheit.

From the foregoing, it should be evident that the present invention provides novel means for attaining its objectives, in that the automatically operable apparatus disclosed demonstrates an appreciable advancement over that disclosed in said patent.

Lest the reciprocable mechanism 36—38 be judged unwieldy, it is here noted that the majority of included parts consist of lightweight castings, such as aluminum or the like.

Most of the loading mechanism 32 is likewise of lightweight material, so that motor 42 and the four air cylinders have no difficulty in completing a cycle of operation within the time prescribed.

From the foregoing description, and in view of the comprehensive drawings, it is believed that a complete disclosure of the invention has been presented.

It is understood of course, that the invention is not to be limited to the precise details of construction illustrated and described. The embodiment of the invention illustrated has been subjected to prolonged tests and has demonstrated high efficiency. Obviously however, slight modifications may be made without departing from the principles of the invention, which is to be limited only by the scope of the claims.

What we claim is:

1. In apparatus of character described: a machine for reciprocating a plurality of containers partially filled with a predetermined quantity of pasteurized cream simultaneously with the injection thereinto of a gas under predetermined pressure; a plate type conveyor for delivering said containers to the machine; air cylinder operable mechanism for transferring a plurality of containers from said conveyor onto a bed member normally flush with the upper surface thereof; gas injection mechanism including a sealed manifold whereon a plurality of injection assemblies is mounted; air cylinder operable mechanism for alternately lowering and elevating said manifold and the gas injection assemblies into and out of engagement respectively with the upper end of each of said containers; a continuously operating motor; a rotatable shaft supported in spaced hanger bearings and having an eccentric portion integrally formed therewith; a connecting rod the lower end of which is mounted on said eccentric portion and the upper end of which is pivotally connected to said bed member; an air cylinder operable clutch assembly including a first member having a driving connection with said motor and a second axially slidable member adapted to effect the transmission of power from the motor to said shaft; a driving connection between said motor and a combined speed reducer and transmission device adapted to complete one revolution of the output shaft of said device in approximately thirty seconds; a plate type cam rigidly secured to the projecting end of said output shaft and a master air valve operable thereby; an air pressure regulating valve; and a metering valve adapted to delay engagement and to accelerate disengagement of the clutch assembly aforesaid.

2. In apparatus of character described: a machine for reciprocating a plurality of containers partially filled with a predetermined quantity of pasteurized cream simultaneously with the injection thereinto of a gas under predetermined pressure; a plate type conveyor for delivering said containers to the machine; air cylinder operable mechanism for transferring a plurality of containers from said conveyor onto a bed member normally flush with the upper surface thereof; gas injection mechanism including a sealed manifold whereon a plurality of injection assemblies is mounted; air cylinder operable mechanism for alternately lowering and elevating said manifold and the gas injection assemblies into and out of engagement respectively with the upper end of each of said containers; a continuously operating motor; a rotatable shaft supported in spaced hanger bearings and having an eccentric portion integrally formed therewith; a connecting rod the lower end of which is mounted on said eccentric portion and the upper end of which is pivotally connected to said bed member; an air cylinder operable clutch assembly including a first member having a driving connection with said motor and a second axially slidable member adapted to effect the transmission of power from the motor to said shaft; a driving connection between said motor and a combined speed reducer and transmission device adapted to complete one revolution of the output shaft of said device in approximately thirty seconds; a plate type cam rigidly secured to the projecting end of said output shaft and a master air valve operable thereby; an air pressure regulating valve; a metering valve adapted to delay engagement and to accelerate disengagement of the clutch assembly aforesaid; a plate type conveyor for discharging processed containers; a horizontally disposed base plate and structure mounted thereon for supporting the upper and lower stretches of said discharge conveyor; a guide plate rigid with said conveyor supporting structure for maintaining processed containers in longitudinal alinement on said discharge conveyor, and driving connections adapted to synchronize the travel of both said conveyors in the same direction.

3. In a machine for manufacturing whipped cream: supporting structure for maintaining in a horizontal plane the upper stretch of a container delivery conveyor passing longitudinally across the machine; supporting structure for similarly maintaining the upper stretch of a container discharge conveyor also passing longitudinally across the machine; a reciprocable bed member the upper surface of which is normally flush with the upper surfaces of said conveyors, said bed member being interposed between them; a stationary and a retractible guide for maintaining containers on the delivery conveyor in alinement; means operable by an air cylinder for alternately elevating and lowering the retractible guide; loading mechanism operable by an air cylinder for transferring a plurality of containers from the delivery conveyor onto said bed member and from the latter onto said discharge conveyor; a manifold supplied with a gas under pressure and provided with a plurality of gas injection assemblies; means operable by an air cylinder for alternately lowering and elevating said manifold; a horizontally supported shaft provided with an eccentric portion whereon is mounted the lower end of a connecting rod the upper end of which has a pivotal connection with said bed member; clutch mechanism associated with said shaft; a constantly operating motor; a driving connection between the motor and said clutch mechanism; and means operable by an air cylinder for alternately effecting clutch engagement to reciprocate said bed member, and clutch disengagement to arrest further reciprocation thereof.

4. In a machine for manufacturing whipped cream: a horizontally supported base plate; a U-shaped bracket mounted thereon adjacent the rear marginal edge and centrally thereof; an air cylinder provided with opposed trunnions each projecting into a circular opening provided in the upstanding legs of said bracket; an eye member rigid with the projecting piston rod of said cylinder; a horizontally supported rock shaft; a clevis secured thereto centrally thereof; a pivot pin passing through said eye and the leg portions of said clevis whereby reciprocable movements of the piston rod partially rotate the rock shaft; a pair of links each rigidly secured to one reduced end portion of said shaft; and a pivotal connection between the free end of each link and the lower end of a vertically extending arm the upper end of which is pivotally attached to a movable arm secured to a gas injection assembly included in the machine.

5. In a machine for manufacturing whipped cream: a stationary frame; a continuously operating motor, a combined speed reducer and transmission device, and a horizontally disposed base plate supported on said frame; clutch mechanism mounted on the underside of said base plate adapted to transmit the power of said motor to a horizontally disposed crankshaft rotatable in spaced hanger bearings also mounted on the underside of said base plate; a driving connection between said motor and said speed reducing transmission; a plate cam rigid with the projecting end of the output shaft of said transmission and adapted to control the action of a master valve included in a compressed air system associated with the machine; a horizontally disposed bed member for receiving and supporting a plurality of containers; a connecting rod passing through a circular opening in said base plate, the lower end of said rod being mounted on the eccentric portion of said crankshaft and the upper end having a pivotal connection with said bed member; a pair of composite transversely extending arms the rear ends of which are pivotally supported in spaced brackets rigidly mounted on said base plate and the free forward ends of which are secured to said bed member; and an air cylinder for effecting alternate engagements and disengagements of said clutch mechanism as the plate cam aforesaid revolves.

6. In a machine for manufacturing whipped cream: a compressed air system including a master valve; a delivery line leading from a source of supply to said valve; a pressure regulator in said delivery line; a stationary loader bar-operating cylinder, a stationary guide-operating cylinder, a stationary clutch-operating cylinder, and a trunnion mounted manifold-operating cylinder in fluid communication with and controlled by said master valve; a metering valve interposed in the line between said clutch-operating cylinder and the master valve; a rack formed on the projecting piston rod of said loader bar cylinder for oscillating a segmental gear; a block secured to the projecting piston rod of said guide cylinder for pivotally supporting a link also connected to the guide; a shifter member secured to the projecting piston rod of said clutch cylinder for moving a clutch element; an eye member rigid with the projecting piston rod of said manifold cylinder for the reception of a pivot pin mounted in a clevis secured to a rock shaft; a pivoted link connected at its lower end to the projecting piston rod of the master valve and supporting a roller at its upper end; a plate cam in continuous engagement with said roller; and motive means for completing one revolution of said cam in approximately thirty seconds to reciprocate the last named piston rod.

7. In a machine for manufacturing whipped cream: a gas injection assembly including a manifold; a delivery tube for supplying the manifold with gas under pressure; means for sealing both ends of the manifold against escape of gas; a plurality of spaced injection nozzles removably secured to the manifold; a resilient plug for sealing the upper end of each nozzle; a slightly tapered member of resilient material surrounding the projecting lower end of each nozzle; means for sealing the openings in the manifold through which the lower ends of the nozzles project; longitudinally spaced arms for suspending the manifold; and means for alternately raising and lowering the assembly.

8. The gas injection assembly of claim 7, wherein each of the plurality of spaced injection nozzles includes a tubular upper portion, an annular laterally projecting flange portion, a tubular lower portion, a tubular intermediate portion of a slightly smaller external diameter than said lower portion, and at least one horizontal port formed in said intermediate portion immediately below said flange portion.

9. The gas injection assembly of claim 7, wherein each of the resilient plugs for sealing the upper ends of said nozzles includes a body portion in contact with the top wall of said manifold and a reduced extension which projects a short distance into the nozzle; wherein each of the slightly tapered members of resilient material includes an annular flange portion, a skirt portion which surrounds the projecting lower end of the nozzle, and a rounded lower marginal edge portion which normally extends slightly below the corresponding edge of said nozzle; and wherein the bottom wall of said manifold has formed therein a longitudinal series of evenly spaced annular recesses to accommodate the flanges of said tapered members, and a similar series of circular openings each concentric with one of said recesses to accommodate the flange portions of said nozzles.

10. The gas injection assembly of claim 7 wherein the plurality of spaced injection nozzles is removably secured to the manifold by means including a retainer plate extending from end to end thereof and resting on the bottom wall of the manifold, a longitudinal series of equally spaced annular openings formed in the plate to accommodate said nozzles, two spaced circular apertures formed in said plate on the transverse centerline of each said annular opening, two similar apertures provided in the bottom wall of said manifold in vertical alinement with the apertures in said plate, a clamping ring provided with a recessed central opening for accommodating the flanged tapered member, a sealing gasket interposed about the flange of the latter between the upper face of each ring and the underside of said manifold bottom wall, a bushing provided with a squared head and an internally threaded shank portion positioned in each pair of said vertically alined apertures, and tap screws passing through registering holes in said ring and in said gasket into engagement with the bushing aforesaid.

11. The apparatus of claim 1 wherein the machine adapted to reciprocate a plurality of cream containers simultaneously with the injection thereinto of a gas under pressure includes a framework of front and rear standards rigidly connected by upper and lower angle rails; supporting structure for the forward end of said delivery conveyor; supporting structure for the rear end of said discharge conveyor; a platform supported by the lower rails for mounting the motor; and a rectangular base plate supported by the upper rails, said plate having formed therein a relatively large circular opening on the transverse center line and approximately centrally thereof, a smaller circular opening on said centerline and adjacent the front marginal edge thereof, a pair of spaced elongated slots, a series of threaded apertures about said large openings, a series of threaded apertures about said smaller opening, a pair of threaded apertures intermediate said openings, a first series of threaded apertures adjacent the rear marginal edge and centrally thereof, a second series of threaded apertures adjacent the rear marginal edge thereof in transverse alinement with the elongated slots aforesaid, and a threaded aperture adjacent each of said slots.

12. The apparatus of claim 1 in combination with an abutment member for checking the forward travel of the leading container of the containers being delivered, said abutment member including a stationary horizontally disposed bar extending across said container delivering conveyor in vertically spaced relation relative thereto, and supporting structure for said bar rigid with the framework of the machine included in said apparatus.

NORMAN J. PFEIFFER.
FRED F. SUELLENTROP.

REFERENCES CITED

The following references are of record in the file of this patent:

UNITED STATES PATENTS

| Number | Name | Date |
|---|---|---|
| 1,416,345 | Gosselin | May 16, 1922 |
| 1,418,203 | Pennock | May 30, 1922 |
| 1,872,686 | Cundall | Aug. 23, 1932 |
| 2,146,072 | Howard | Feb. 7, 1939 |
| 2,478,212 | Thoms | Aug. 9, 1949 |